(12) United States Patent
Wetter et al.

(10) Patent No.: US 11,551,901 B2
(45) Date of Patent: Jan. 10, 2023

(54) SURGE PROTECTION DEVICE ENSEMBLE

(71) Applicant: PHOENIX CONTACT GMBH & CO. KG, Blomberg (DE)

(72) Inventors: Martin Wetter, Detmold (DE); Peter Berg, Schlangen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/972,167

(22) PCT Filed: Jun. 4, 2019

(86) PCT No.: PCT/EP2019/064397
§ 371 (c)(1),
(2) Date: Dec. 4, 2020

(87) PCT Pub. No.: WO2019/233970
PCT Pub. Date: Dec. 12, 2019

(65) Prior Publication Data
US 2021/0249211 A1    Aug. 12, 2021

(30) Foreign Application Priority Data

Jun. 4, 2018  (DE) .......................... 102018208725.3

(51) Int. Cl.
H01H 85/02 (2006.01)
H02H 9/04 (2006.01)
H01H 9/10 (2006.01)

(52) U.S. Cl.
CPC .......... H01H 85/0241 (2013.01); H01H 9/10 (2013.01); H02H 9/044 (2013.01)

(58) Field of Classification Search
CPC .. H01H 85/0241; H01H 9/10; H01H 85/2045; H01H 89/00; H01H 85/30; H01H 83/10; H01H 85/44; H02H 9/044
See application file for complete search history.

(56) References Cited

U.S. PATENT DOCUMENTS 4,559,504 A * 12/1985 Krec .................. H01H 85/26
                                                337/194
6,940,021 B2 * 9/2005 Pohl .................... H01H 9/10
                                                174/137 R
(Continued)

FOREIGN PATENT DOCUMENTS

DE    102010012684    9/2011
EP    0436881    7/1991
GB    2490351    10/2012

OTHER PUBLICATIONS

Official Action for German Patent Application No. 102018208725.3, dated Apr. 30, 2019, 6 pages.
(Continued)

Primary Examiner — Stephen S Sul
(74) Attorney, Agent, or Firm — Sheridan Ross P.C.

(57) ABSTRACT

The invention relates to a surge protection device ensemble comprising a surge protection device having an overvoltage protection means in a first housing, wherein the first housing has at least two connections for contacting the overvoltage protection means, characterized in that the surge protection device ensemble also has a fuse module having a fuse in a second housing, wherein the second housing has at least two connections for contacting the fuse, characterized in that the second housing having one of the connections of the fuse module is inserted in a form-fitting manner into one connection of the at least two connections of the surge protection device, wherein the fuse module provides an electrical connection on the inserted side between the fuse module and the surge protection device.

12 Claims, 6 Drawing Sheets

(56) References Cited

U.S. PATENT DOCUMENTS

| | | | | |
|---|---|---|---|---|
| 7,109,833 B1* | 9/2006 | Pohl | .................. | H01H 47/18 |
| | | | | 335/59 |
| 7,576,630 B2* | 8/2009 | Darr | .................. | H01H 85/34 |
| | | | | 337/72 |
| 9,673,550 B2* | 6/2017 | Trinh | .................. | H01R 13/506 |
| 10,121,615 B1* | 11/2018 | Wu | .................. | H01H 71/02 |
| 2008/0184560 A1* | 8/2008 | Pizzi | .................. | H01H 85/56 |
| | | | | 29/874 |
| 2011/0163836 A1* | 7/2011 | Darr | .................. | H01H 71/04 |
| | | | | 337/143 |
| 2011/0163837 A1* | 7/2011 | Darr | .................. | H01H 71/123 |
| | | | | 337/186 |
| 2011/0169599 A1* | 7/2011 | Darr | .................. | H01H 9/104 |
| | | | | 337/143 |
| 2012/0056708 A1* | 3/2012 | Ventura | .................. | H01H 85/545 |
| | | | | 337/207 |
| 2012/0206848 A1* | 8/2012 | Gillespie | .................. | H02H 5/041 |
| | | | | 361/104 |
| 2013/0187747 A1* | 7/2013 | Reibke | .................. | H01H 85/545 |
| | | | | 337/213 |
| 2016/0372291 A1* | 12/2016 | Darr | .................. | H01H 21/16 |

OTHER PUBLICATIONS

International Search Report and Written Opinion for International (PCT) Patent Application No. PCT/EP2019/064397, dated Sep. 4, 2019, 9 pages.

English Translation of the International Search Report for International (PCT) Patent Application No. PCT/EP2019/064397, dated Sep. 4, 2019, 2 pages.

\* cited by examiner

SURGE PROTECTION DEVICE ENSEMBLE

CROSS REFERENCE TO RELATED APPLICATIONS

This application is a national stage application under 35 U.S.C. 371 and claims the benefit of PCT Application No. PCT/EP2019/064397 having an international filing date of 4 Jun. 2019, which designated the United States, which PCT application claimed the benefit of German Patent Application No. 10 2018 208 725.3 filed 4 Jun. 2018, the disclosures of each of which are incorporated herein by reference in their entireties.

The invention relates to a surge protection device ensemble.

BACKGROUND

Surge protection devices are used in many areas of electrical installation technology. These surge protection devices offer surge protection to downstream devices or equipment.

Particularly in the industrial environment, surge protection devices are used in control cabinets or on a mounting rail.

There are essentially two different types of surge protection devices. A first type incorporates a fuse in addition to an surge protection element, while another type incorporates only the surge protection element without an additional fuse.

Providing surge protection devices without a fuse allows one to produce the surge protection devices in higher quantities and thus more cost-effectively. If a fuse is required, such an additional fuse is spatially wire-fitted in the vicinity. This means that additional installation space is required. If such a fuse is retrofitted in an existing electrical installation, considerable effort can be expected. In addition, the installation space is often inadequate, so that additional fuses cannot be easily placed on a mounting rail.

On this basis, it would be desirable to also provide an installation space-saving fuse while maintaining the cost-effectiveness of the surge protection device so that it can be utilized in a flexible manner.

The task is solved by means of an surge protection device ensemble according to claim 1. Additional advantageous embodiments of the invention are indicated in the dependent claims, the description and the drawings.

BRIEF DESCRIPTION OF THE DRAWINGS

The invention is described in greater detail below with reference to the attached drawings using preferred embodiments.

The invention will be described in greater detail below (with reference to the drawings). It should be noted that various aspects are described which can be used individually or in combination. This means that any given aspect can be used with various embodiments as long as it is not explicitly represented as a mere alternative.

Also, for simplicity's sake and as a rule, reference will always be made below to only one entity. However, unless noted otherwise, the invention may also have several of any of the entities in question. To that extent, the use of the words "a" and "an" are to be understood only as an indication that at least one entity is being used in a single embodiment.

To the extent that methods are described hereinafter, the individual steps of a method can be arranged and/or combined in any sequence as long as the context does not explicitly provide otherwise. Furthermore, the methods can be combined with one other unless expressly indicated otherwise.

As a rule, specifications having numerical values are not to be understood as exact values, but as having a tolerance of +/−1% to +/−10%.

References to standards or specifications or norms shall be understood to be references to standards or specifications or norms which are or were valid at the time of the application or—if a priority is claimed—at the time of the priority filing. However, this shall not be understood as a general exclusion of the applicability of subsequent or superseding standards or specifications or norms.

Hereinafter, "adjacent" explicitly includes a direct proximity relationship without, however, being limited to it, and "between" explicitly includes a position in which the intermediate part is in direct proximity to the surrounding parts.

Figure 1A:
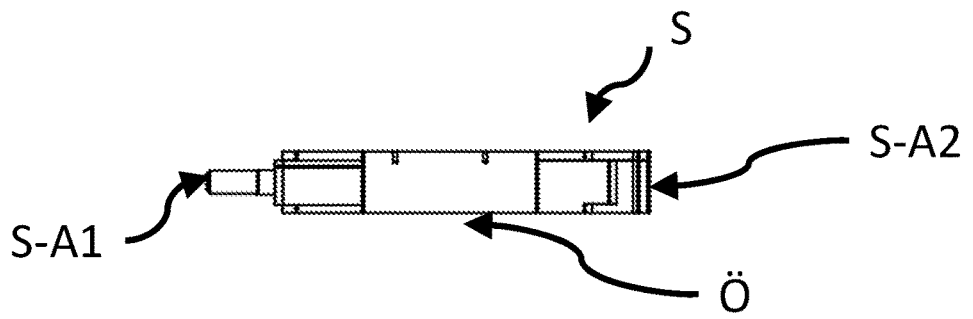
FIGS. 1*a*-1*d* show various views of an aspect according to embodiments of the invention.
Figure 1B:
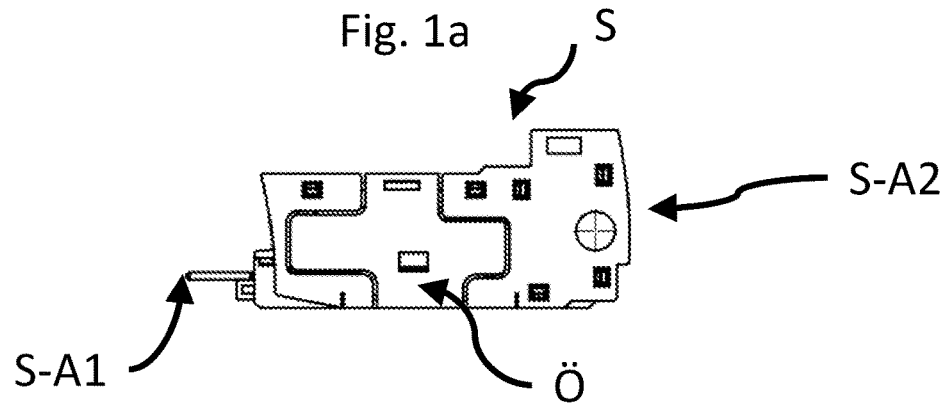
Figure 1C:
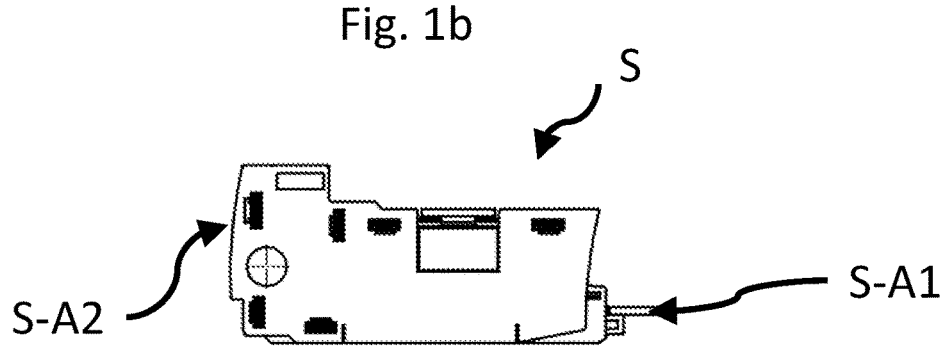
Figure 1D:
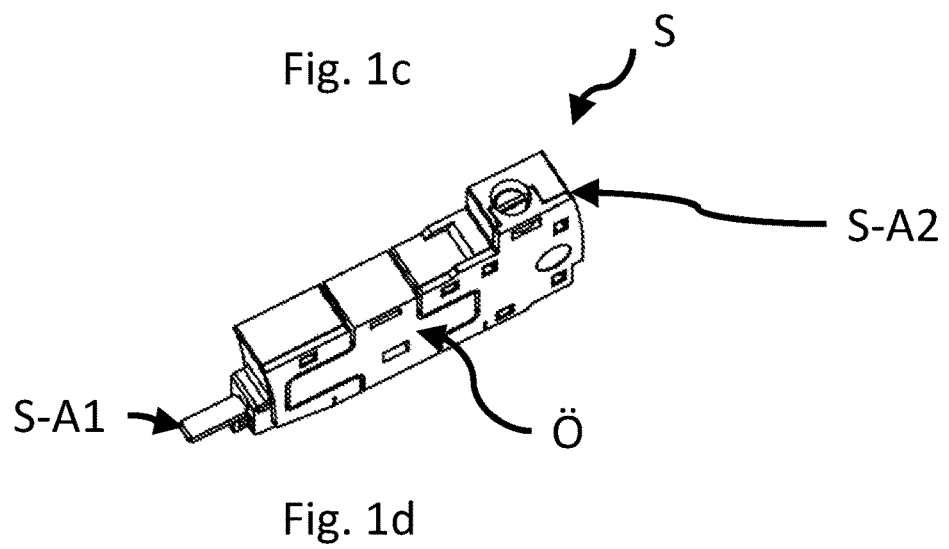
Figure 2:
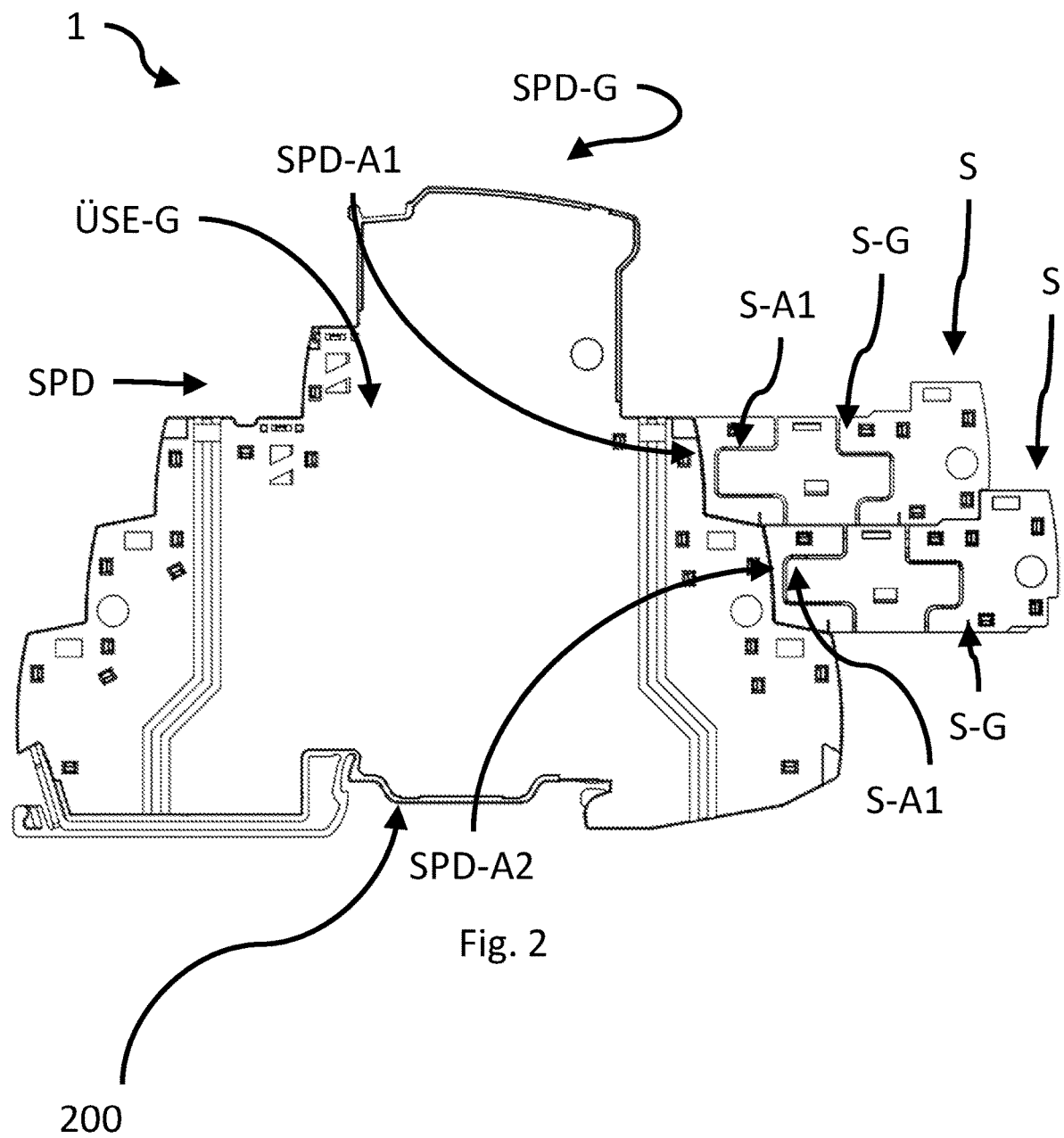
FIG. 2 shows a side illustration of aspects according to embodiments of the invention.

FIG. 2 shows a surge protection device ensemble. Such a surge protection device ensemble 1 comprises a surge protection device SPD having an overvoltage protection means ÜSE-G in a first housing SPD-G.

As one can see in FIG. 2, the surge protection device SPD may have mechanical devices or attachment elements 200 for attaching to a mounting rail. Furthermore, the surge protection device SPD may have devices for electrically contacting a potential conductor, e.g., the mounting rail. This electrical contacting may for example also be combined with the mechanical device for attaching to a mounting rail or be integrated in it. The inner electrical circuit structure of the overvoltage protection means ÜSE-G of the surge protection device SPD may be designed in a suitable manner (circuit structure of the overvoltage protection means ÜSE-G is understood to be within the housing SPD-G).

The surge protection device may provide connections for one or more different protected/unprotected potentials. The first housing SPD-G of the surge protection device ensemble 1, i.e., the housing of the surge protection device SPD, has at least two connections SPD-A1, SPD-A2 for contacting the overvoltage protection means ÜSE-G.

Furthermore, the surge protection device ensemble 1 comprises at least one fuse module S having a fuse F in a second housing S-G. The drawing illustratively shows two fuse modules S in a form-fitting arrangement relative to each other.

The second housing S-G of the surge protection device ensemble 1, i.e., the housing of the fuse module S, has at least two connections S-A1, S-A2 for contacting fuse F. The second housing S-G may be form-fittingly inserted with one of the connections, in this case with the left connection S-A1 of the fuse module S, into a connection, e.g., connection A1 or connection A2 of the at least two connections A1, A2 of the surge protection device SPD. If a fuse module S is inserted in such a manner, an electrical connection is provided on the inserted side between the fuse module S and the surge protection device SPD.

This now means that the fuse module(s) S can also be attached to the surge protection devices SPD at a later point in time. Since the fuse modules can be used instead of a direct conductor connection, for example, no additional installation space is required in the vicinity/next to the surge protection device SPD. In other words, the ensemble can also be utilized in tight installation spaces and thus allows one to flexibly provide a conductor with a fuse S.

Such fuse modules S offer a substantial advantage specifically in applications having high operating voltages and currents.

A particular advantage is that the fuse modules of the proposed surge protection device ensemble 1 are form-fitting. The fuse module can thereby be mounted in a form-fitting manner to a surge protection device SPD on at least one of two or more connections. Alternatively or additionally, an arrangement of two (or more) fuse modules S can also be designed to be form-fitting among each other as well as in relation to the surge protection device SPD, so that simple installation is made possible. This is achieved, for example, by the outer contour of the elements of the surge protection device ensemble 1. In the predetermined arrangement, this is preferably executed in such a manner that the fuse modules S engage one on top of the other in such a manner that first the bottom fuse module S can be connected and then the upper fuse module S can be connected in a second step. The fuse modules S now interlock in their outer contour in a space-saving manner.

The (respective) fuse module S electrically contacts one of the present connection terminal blocks of the surge protection device SPD and in turn provides an additional connection terminal block for connecting a conductor. This means that if a fuse module S is retrofitted, the previous conductor can be removed from the corresponding connection SPD-A1, SPD-A2, and then the fuse module can be used (and possibly protected) in the connection freed up in this manner. The previous conductor can then be used (and possibly protected) in the connection S-A2 on fuse module S.

This means that, depending on the application, customers can decide whether to provide one path or even multiple paths with a fuse module S.

Particularly advantageously, the fuse module S is designed in such a manner that it can be connected to all connections of the surge protection device SPD.

The connections SPD-A1, SPD-A2 as well as the connection SPD-A2 may have suitable fuse devices. For example, screw connections or clamps, such as the push-in technology of the applicant, may be provided. The connection S-A1 of the fuse module S may be produced for example from a suitable stamped part which has a cross-section in accordance with the nominal currents to be carried.

The fact that the fuse module S may also have an essentially one-piece housing is particularly advantageous.

In one embodiment of the invention, the fuse module S is designed in such a manner that it can be inserted into each connection SPD-A1, SPD-A2 of the surge protection device SPD. However, without limiting generality, it may also be provided that a certain sequence must be complied with. However, this is not absolutely necessary and it may also be designed differently by means of a suitable design of the fuse module S.

In particular, the surge protection device SPD may be designed in such a manner that a similar fuse module can be inserted in a form-fitting manner in each of the connections SPD-A1, SPD-A2, etc. In this way, the number of possible fuse modules can be kept low, which makes low production costs possible. In addition, installation is simplified since mix-ups and thus possibly incorrect installations are now no longer possible.

As already described, the surge protection device SPD may have attachment elements 200 for a support rail. This means that the surge protection device ensemble 1 can be installed in typical control cabinets. However, other attachments may also be provided alternatively or additionally, e.g., screw connections or similar.

In another embodiment of the invention, the surge protection device SPD and/or the fuse module(s) S have an overall width of less than 7 mm, particularly preferably 6.2 mm or less.

According to an additional embodiment of the invention, the surge protection device SPD and the fuse module S have cooperating holding elements, which provide a detachable connection. For example, the connection S-A1 may be designed in a pin-like manner so that it can be inserted into a correspondingly designed socket-like connection SPD-A1, SPD-A2. For example, the socket-like connection SPD-A1, SPD-A2 may be a push-in connection or a screw connection. The connection S-A2 of the fuse module S may be designed in a similar manner as the socket-like connection SPD-A1, SPD-A2. For example, as one can see in FIGS. 1*d*, 3-6, the connection S-A2 of the fuse module S may be designed as a screw connection.

Figure 3:
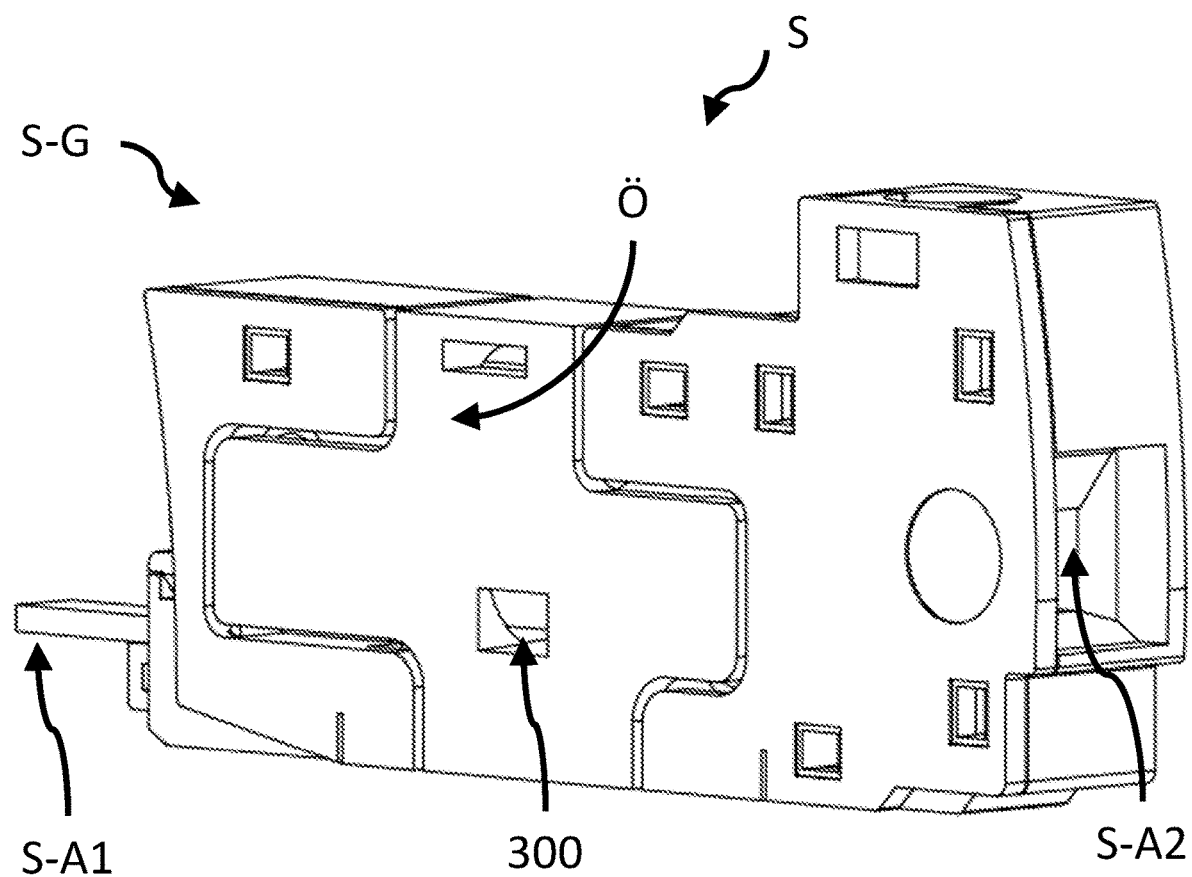
FIG. 3 shows a spatial perspective illustration of aspects according to embodiments of the invention in a first state.
Figure 4:
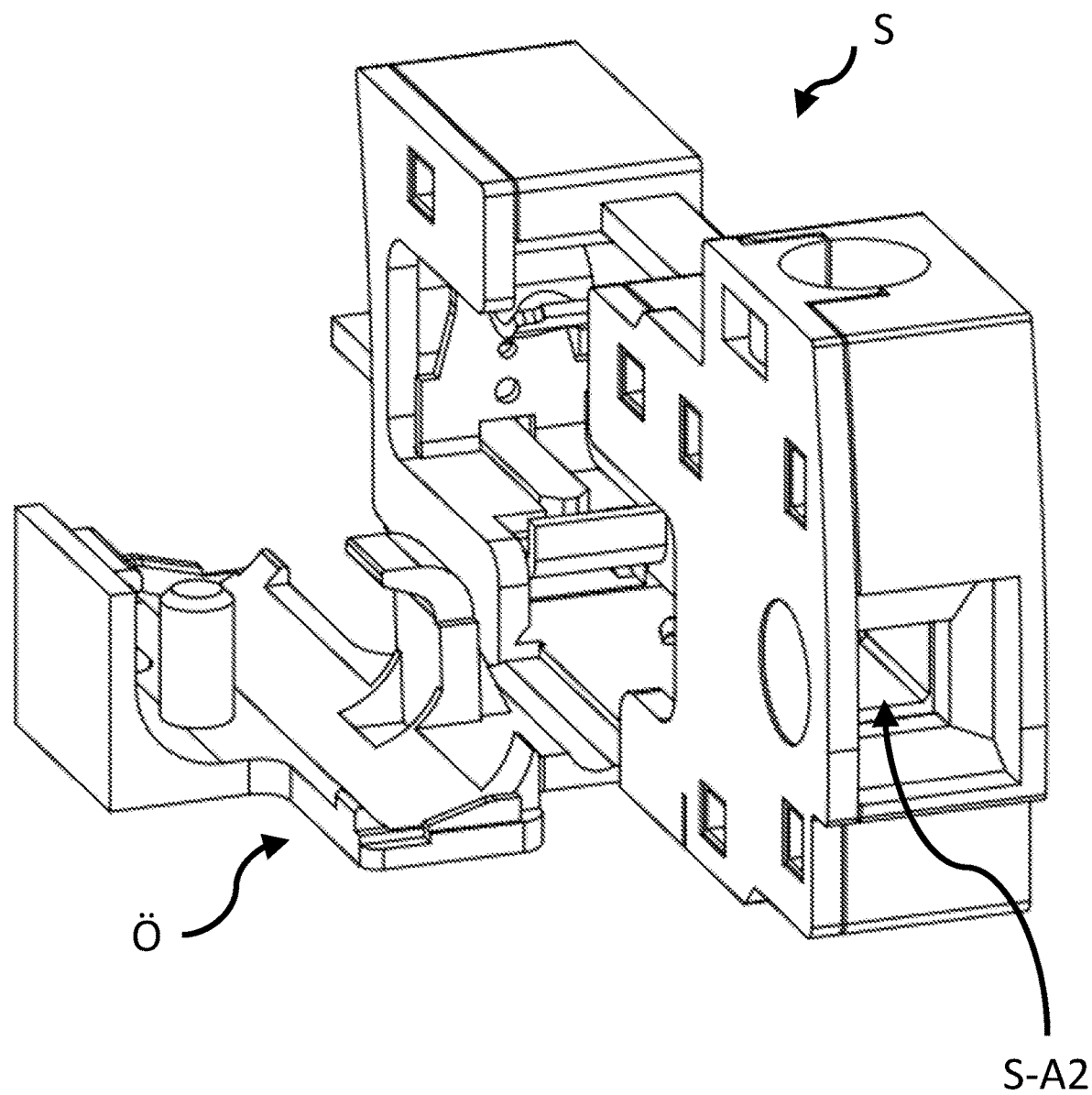
FIG. 4 shows a spatial perspective illustration of aspects according to embodiments of the invention in a second state.
Figure 5:
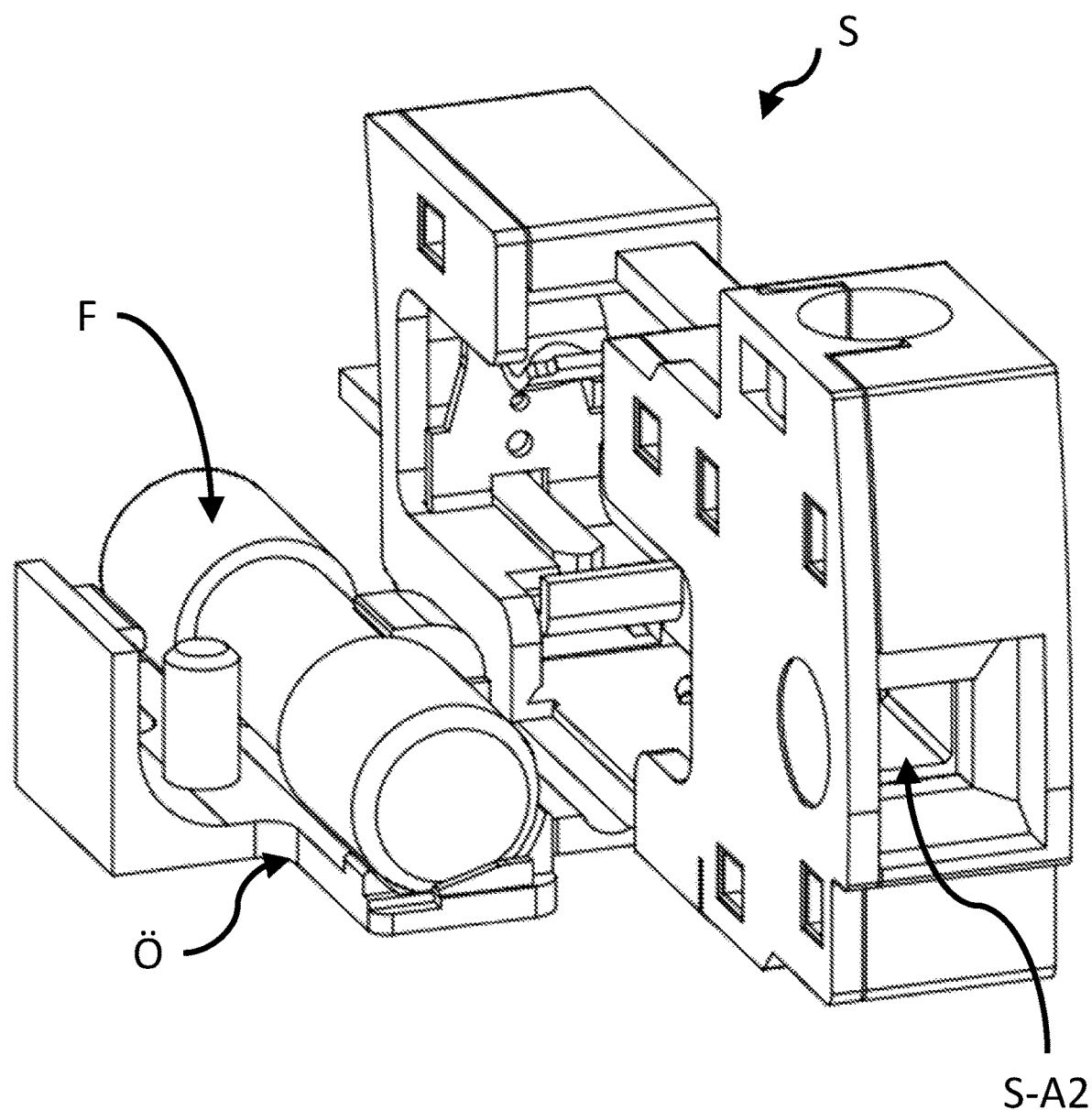
FIG. 5 shows a spatial perspective illustration of aspects according to embodiments of the invention in a third state.
Figure 6:
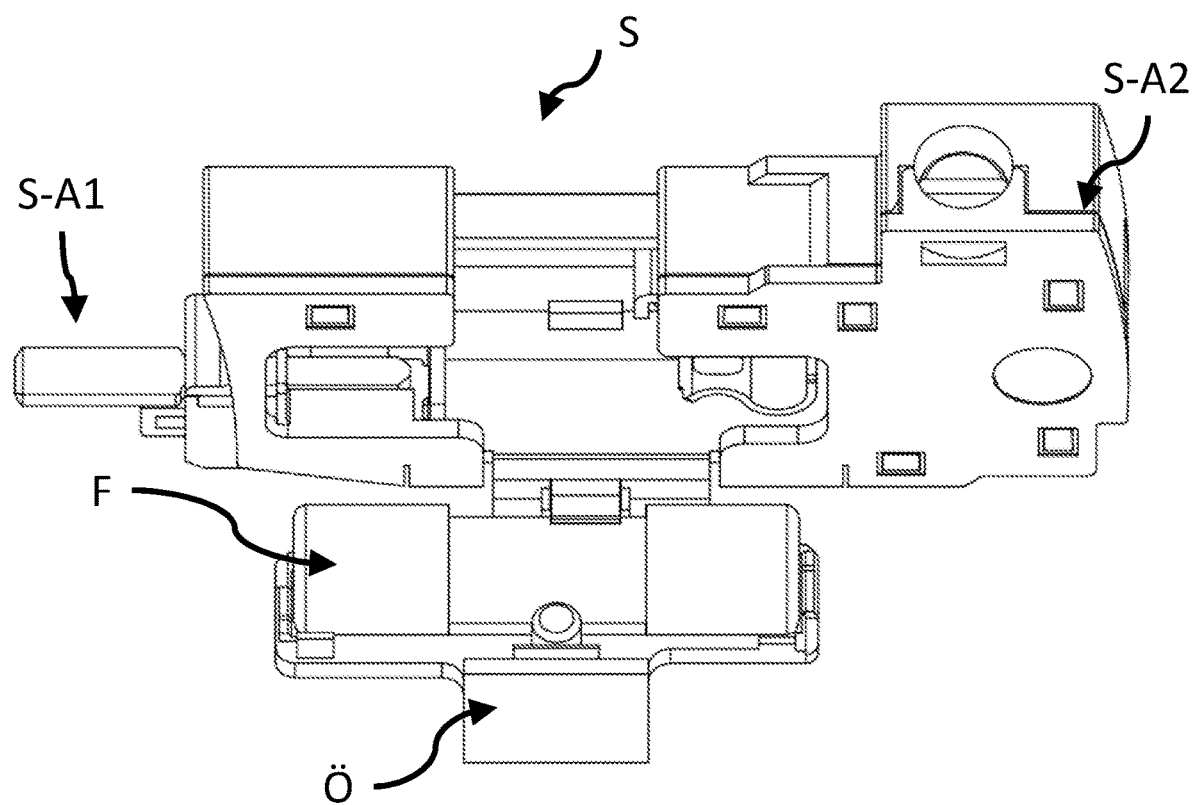
FIG. 6 depicts another spatial perspective illustration of aspects according to embodiments of the invention in a third state.

In another embodiment of the invention, the housing S-G of the fuse module S has an opening Ö, through which a fuse F can be inserted and/or removed. This means that the fuse may be fabricated in accordance with the intended purpose in the field. Likewise, the fuse can also be changed in the event of a malfunction. This means that the design allows cost-effective installation as well as cost-effective repair. In this connection, reference is made to FIGS. 3-6. FIG. 3 shows the fuse module S in a state having a closed opening and the inserted fuse F, i.e., ready for installation. FIG. 4 shows the fuse module S with the opening Ö opened and the fuse F removed. FIG. 5 in turn shows the opened state with the fuse F inserted in a diagonal side view, while FIG. 6 shows a lateral, diagonally downward view. The electrical contact elements, which are integrated in the fuse module S and in electrical contact with the connections S-A1 and S-A2, are visible here. When the opening Ö with the inserted fuse F closes, the corresponding electrical contacts to fuse F are created. As one can see in FIGS. 3-6, the opening Ö may be designed in a hinge-like manner.

Without limiting generality, the opening Ö may be a flap opening or a twist opening or a slide opening. This means that the fuse model S may be designed with a one-piece housing S-G, which allows changing the fuse F. This can be created for example by provision of a double-film hinge at the opening Ö. In other words, the opening Ö can be capped by a one-piece closure.

Furthermore, the housing S-G of the fuse module S may have a status indicator 300 of the fuse F. This status indicator 300 is provided by a lateral viewing window. A viewing window can be arranged here on the side of the opening Ö and/or on the opposite side. However, other locations such as the top side and bottom side (e.g., in relation to the illustration in FIG. 1*a-d*) are also alternatively or additionally possible. It shall be noted that in the event that multiple fuse modules S are arranged side by side, e.g., given two surge protection devices SPD arranged side by side, the ability to directly read a status of the fuse F may not always be possible. In this case, the corresponding fuse F can be readily inspected by removing/pulling off the fuse module.

According to another embodiment of the invention, the surge protection device ensemble 1 has two fuse modules S, wherein the two fuse modules S are in each case inserted in one of the two connections of the surge protection device SPD, wherein the two fuse modules S can be arranged in a form-fitting manner. This means that the fuse modules S may interlock and thus also mutually support each other. In this way, higher mechanical forces can be absorbed, which substantially increases the robustness.

LIST OF REFERENCE SIGNS

1 Surge protection device ensemble
SPD Surge protection device
ÜSE-G Overvoltage protection means
SPD-G Housing
SPD-A1, SPD-A2 Connections
S Fuse module
F Fuse
S-G Housing
S-A1, S-A2 Connections
Ö Opening

The invention claimed is:

1. A surge protection device ensemble, comprising:
a surge protection device including an overvoltage protection circuit in a first housing, wherein the overvoltage protection circuit protects downstream equipment from overvoltage events, wherein the first housing has at least two connections for contacting the overvoltage protection circuit;
a fuse module having a fuse in a second housing, wherein the second housing has at least two connections for contacting the fuse, wherein a first connection of the at least two connections of the second housing is insertable in a form-fitting manner into a first connection of the at least two connections of the first housing as push-in connection of the fuse module to the surge protection device, wherein the fuse provides an electrical connection between the fuse module and the surge protection device; and
a second fuse module that is insertable in a form-fitting manner into a second connection of the at least two connections of the first housing as a push-in connection of the second fuse module to the surge device, wherein the fuse module and the second fuse module form-fit with one another when inserted into the first housing,
wherein the second housing of the fuse module comprises:
an opening through which the fuse is installed and removed; and
a cover that covers and uncovers the opening, wherein the fuse fits into the second housing through the opening;

wherein a bottom surface of the second housing of the fuse module comprises a protrusion at an end of the second housing opposite an end of the second housing having the first connection of the at least two connections of the second housing, wherein the protrusion form-fits with a corresponding notch on a top surface the second fuse module.

2. The surge protection device ensemble according to claim 1, wherein the fuse module is on top of the second fuse module when connected to the surge protection device, and wherein the bottom surface of the second housing of the fuse module and the top surface of the second fuse module form-fit with one another such that the second fuse module is connected to the surge protection device before the fuse module can be connected to the surge protection device.

3. The surge protection device ensemble according to claim 1, wherein the opening is in a side surface of the second housing of the fuse module that joins a top surface of the second housing to the bottom surface of the second housing.

4. The surge protection device ensemble according to claim 1, wherein the surge protection device comprises attachment elements that attach to a support rail.

5. The surge protection device ensemble according to claim 1, wherein both the surge protection device and the fuse module have an overall width of less than 7 mm.

6. The surge protection device ensemble according to claim 1, wherein both the surge protection device and the fuse module have an overall width of 6.2 mm.

7. The surge protection device ensemble according to claim 1, wherein the surge protection device and the fuse module are detachably connected.

8. The surge protection device ensemble according to claim 1, wherein the cover is a flap cover, twist cover or slide cover.

9. The surge protection device ensemble according to claim 1, wherein the opening is configured to be capped by a one-piece closure.

10. The surge protection device ensemble according to claim 1, wherein the second housing of the fuse module comprises a status indicator of the fuse.

11. The surge protection device ensemble according to claim 1, wherein the cover accommodates the fuse such that when the cover is open the fuse does not make electrical contact with the at least to connections of the second housing, and when the cover closes with the fuse accommodated therein electrical contact is created between the fuse and the at least two connections of the second housing.

12. The surge protection device ensemble according to claim 1, wherein the second connection of the at least two connections of the second housing of the fuse module connects to the equipment so that the equipment is protected from overvoltage events by the overvoltage protection circuit and from overcurrent events by the fuse.

* * * * *